(12) United States Patent
Ohmiya et al.

(10) Patent No.: US 9,088,715 B2
(45) Date of Patent: Jul. 21, 2015

(54) IMAGE PROCESSING APPARATUS AND IMAGE PROCESSING METHOD FOR IMAGE CORRECTION

(75) Inventors: Jun Ohmiya, Kyoto (JP); Hitoshi Yamada, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 626 days.

(21) Appl. No.: 13/381,399

(22) PCT Filed: Jun. 2, 2011

(86) PCT No.: PCT/JP2011/003105
§ 371 (c)(1),
(2), (4) Date: Dec. 29, 2011

(87) PCT Pub. No.: WO2011/155161
PCT Pub. Date: Dec. 15, 2011

(65) Prior Publication Data
US 2012/0105578 A1 May 3, 2012

(30) Foreign Application Priority Data

Jun. 11, 2010 (JP) ................................. 2010-133623

(51) Int. Cl.
*H04N 5/232* (2006.01)
*G06T 7/00* (2006.01)
(52) U.S. Cl.
CPC .......... *H04N 5/23238* (2013.01); *G06T 7/0042* (2013.01); *G06T 2207/20061* (2013.01); *G06T 2207/30244* (2013.01)

(58) Field of Classification Search
CPC ............. H04N 5/23238; G06T 7/0042; G06T 2207/30244; G06T 2207/20061
USPC .......................... 348/36, 222.1, 241; 386/289
See application file for complete search history.

(56) References Cited

U.S. PATENT DOCUMENTS 5,668,898 A 9/1997 Tatsuta
7,329,057 B2 2/2008 Shimano et al.
(Continued)

FOREIGN PATENT DOCUMENTS

CN 1804682 7/2006
EP 1 184 808 A2 3/2002
(Continued)

OTHER PUBLICATIONS

International Search Report issued Jul. 12, 2011 in International (PCT) Application No. PCT/JP2011/003105.
(Continued)

*Primary Examiner* — David Harvey
(74) *Attorney, Agent, or Firm* — Wenderoth, Lind & Ponack, L.L.P.

(57) ABSTRACT

Both tilt information included in an image and positional information are acquired in order to calculate a relative tilt angle between at least two images. Whether the tilt information can be used to estimate the tilt angle (whether the tilt information is fake information) is determined from a distribution characteristic in the image of the acquired positional information. The tilt angle is estimated from the tilt information determined to be able to be used. A tilt included in the acquired image is corrected using the estimation result, and the image having the correct orientation can be produced.

16 Claims, 14 Drawing Sheets

(56) References Cited

U.S. PATENT DOCUMENTS

| | | | |
|---|---|---|---|
| 7,609,951 B2 | 10/2009 | Shimano et al. | |
| 7,630,021 B2 * | 12/2009 | Matsuzaka et al. | 348/700 |
| 7,859,568 B2 | 12/2010 | Shimano et al. | |
| 8,526,762 B2 * | 9/2013 | Cooper | 382/294 |
| 8,639,023 B2 * | 1/2014 | Kim et al. | 382/154 |
| 2006/0153472 A1 | 7/2006 | Sakata et al. | |
| 2009/0290809 A1 | 11/2009 | Yamada | |
| 2010/0172598 A1 * | 7/2010 | Kimura | 382/296 |
| 2010/0177197 A1 | 7/2010 | Kimura et al. | |
| 2012/0069019 A1 * | 3/2012 | Richards | 345/421 |
| 2013/0188876 A1 * | 7/2013 | Demandolx et al. | 382/199 |

FOREIGN PATENT DOCUMENTS

| | | |
|---|---|---|
| EP | 2 053 844 A1 | 4/2009 |
| EP | 2 160 019 A1 | 3/2010 |
| JP | 63-106875 | 5/1988 |
| JP | 6-290260 | 10/1994 |
| JP | 7-037103 | 2/1995 |
| JP | 2002-207963 | 7/2002 |
| JP | 3676360 | 7/2005 |
| JP | 2006-245726 | 9/2006 |
| WO | 2009/001510 | 12/2008 |
| WO | 2009/001512 | 12/2008 |
| WO | 2009/008174 | 1/2009 |

OTHER PUBLICATIONS

Extended European Search Report issued Jun. 24, 2014, in corresponding Application No. 11792121.3.

Hitoshi Yamada et al., "Image Stabilization Algorithm for Video with Large Image Fluctuation," Consumer Electronics, 2009. ICCE '09, Digest of Technical Papers International Conference on, IEEE, Piscataway, NJ, Jan. 10, 2009, pp. 1-2, XP031466921, ISBN: 978-1-4244-4701-5.

English translation of Chinese Search Report issued Apr. 29, 2015, in related Chinese Application No. 201180003255.8.

* cited by examiner

|    |    |    |
|----|----|----|
| -1 |  0 |  1 |
| -2 |  0 |  2 |
| -1 |  0 |  1 |

FIG. 6A

|    |    |    |
|----|----|----|
|  1 |  2 |  1 |
|  0 |  0 |  0 |
| -1 | -2 | -1 |

| FRAME ID | EDGE ID | x-DIRECTION EDGE | y-DIRECTION EDGE | ANGLE | EDGE INTENSITY | COORDINATES |
|---|---|---|---|---|---|---|
| 1 | 1 | 7.1 | 7.1 | 45 | 10 | (1, 3) |
| 1 | 2 | 17.3 | 10.0 | 30 | 20 | (7, 18) |
| 1 | 3 | 3.5 | 3.5 | 45 | 5 | (3, 104) |
| 1 | 4 | | | | | |

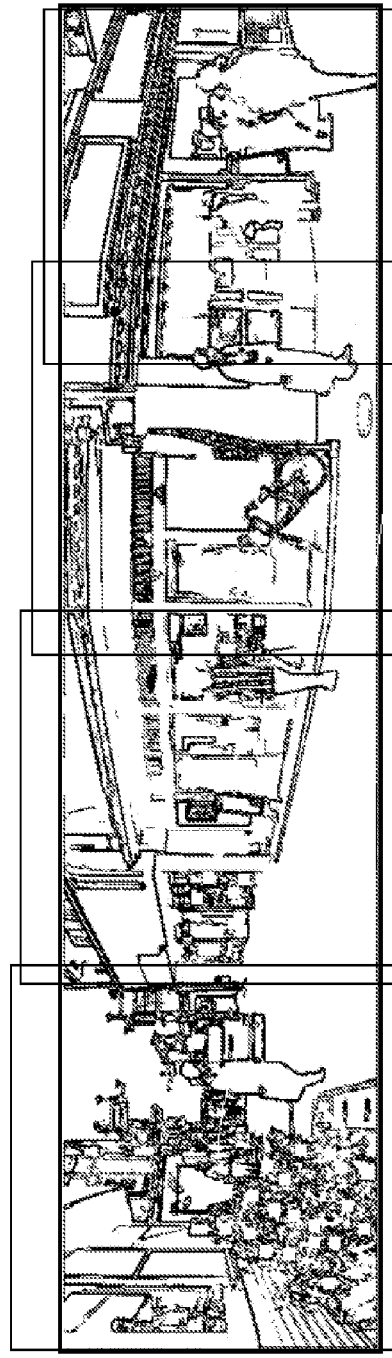
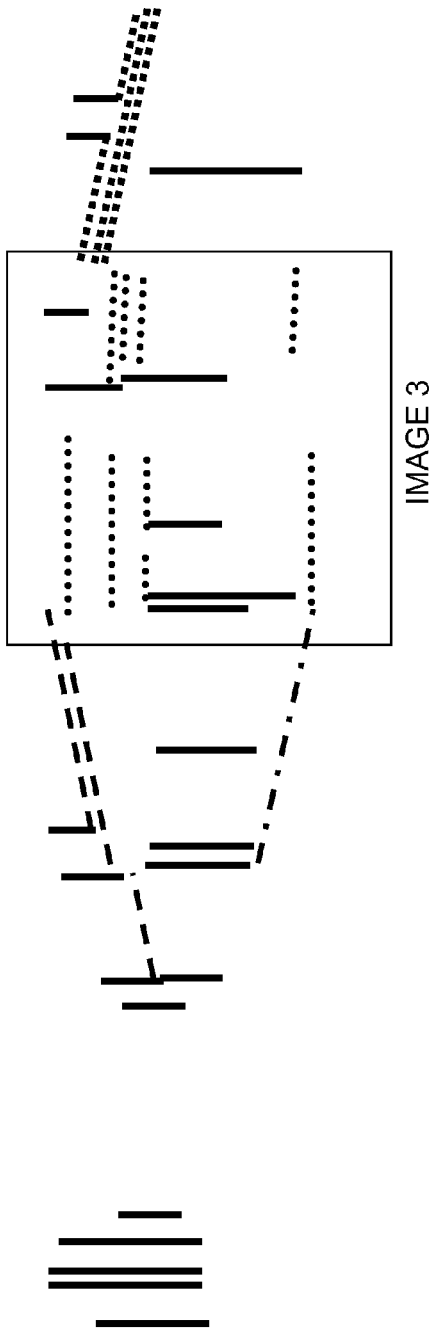
FIG. 11A
FIG. 11B

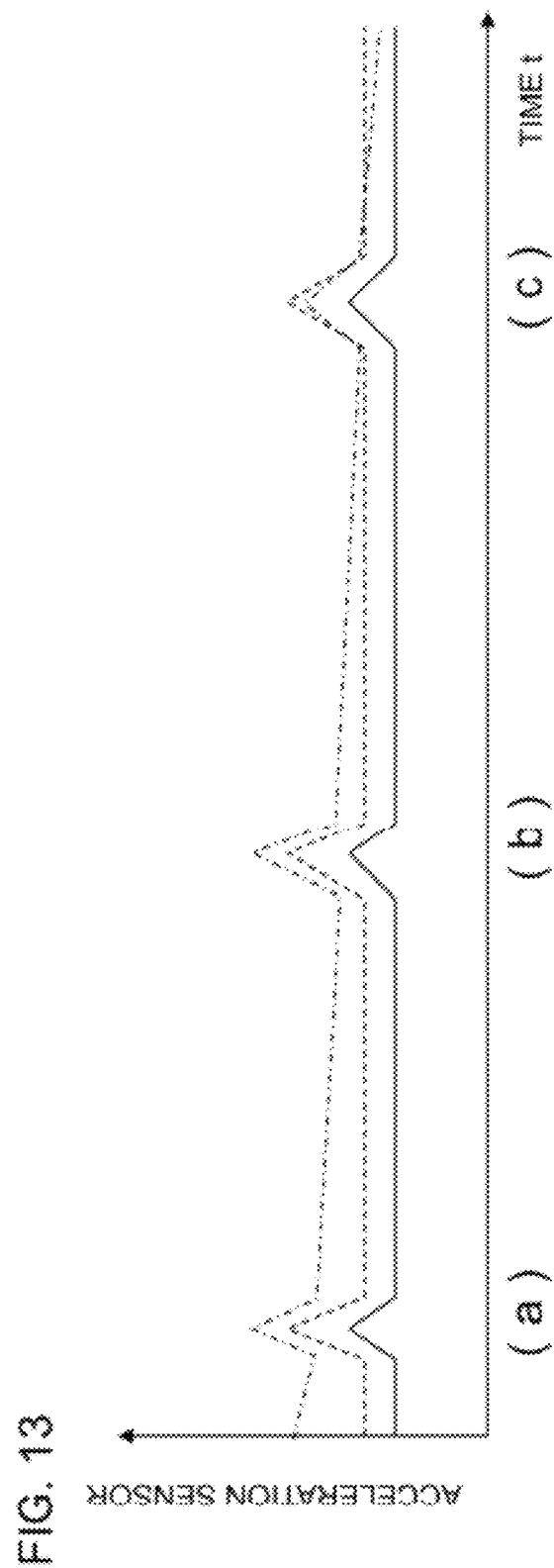

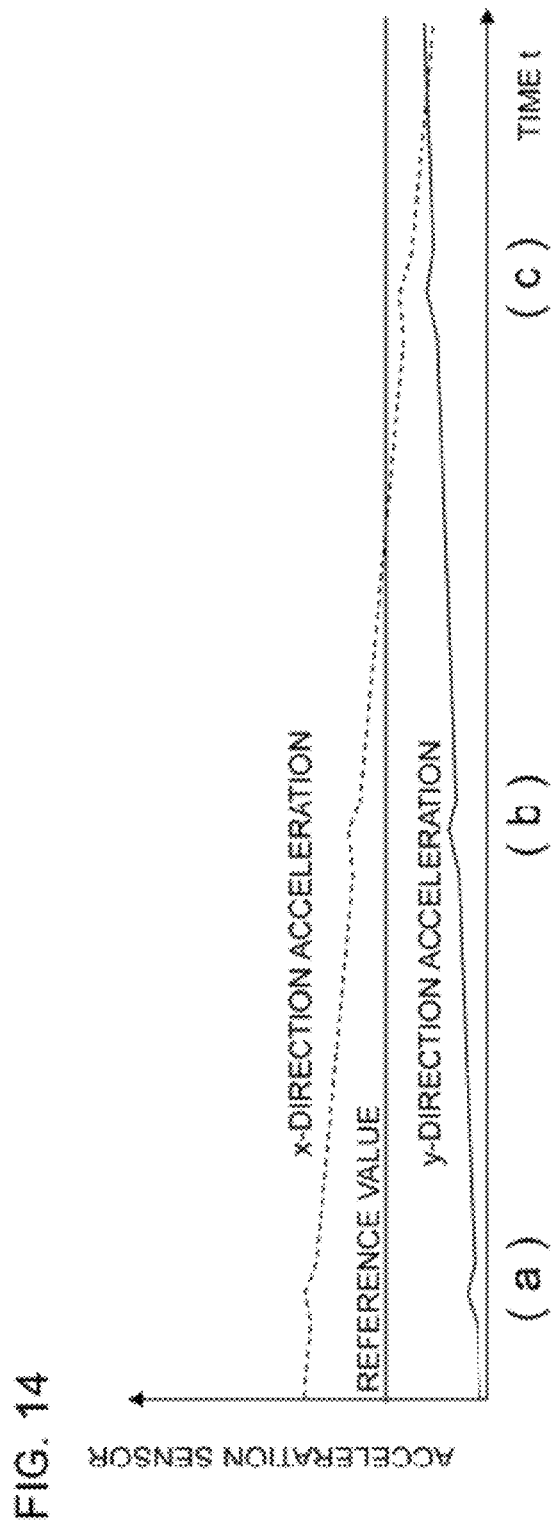

IMAGE PROCESSING APPARATUS AND IMAGE PROCESSING METHOD FOR IMAGE CORRECTION

This application is a U.S. national phase application of PCT international application PCT/JP2011/003105, filed Jun. 2, 2011.

BACKGROUND OF THE INVENTION

1. Technical Field

The present invention relates to an image processing apparatus and an image processing method and, particularly to an image correction technology.

2. Background Art

Recently a technology of correcting a tilt of an image has been proposed in a camera shake correction technology in an imaging apparatus such as a camera and a movie camera.

In a method disclosed in PTL 1, an acceleration sensor is provided in the imaging apparatus, the acceleration sensor measures gravitational acceleration to detect the tilt of the imaging apparatus relative to an earth axis, and the tilt of the image captured based on a detected tilt angle is corrected. In a method disclosed in PTL 2, a line segment existing in an upper portion of a captured image is detected, the tilt angle of the whole image is estimated from the tilt angle of the line segment, and the tilt of the captured image is corrected. In a technique disclosed in PTL 3, a sensor and image processing are used while combined, thereby improving accuracy of calculation of the tilt angle.

In a method disclosed in PTL 4, when the tilt angle of the image is calculated using the image processing, the image is divided into small blocks, directionality indicated by a texture in each block is determined, and only a domain in which the texture has a unidirectional characteristic is targeted to calculate the tilt angle. The method disclosed in PTL 4 is equivalent to extraction of the tilt information only from a structure in the image, and contributes to the improvements of accuracy and stability of the calculation of the tilt angle.

However, in the method disclosed in PTL 1 in which the sensor is used, because an output value of the sensor includes a fluctuation component such as an inertial noise or sensitivity of another axis, the tilt is hardly corrected with high accuracy when a user captures the image with the movie camera while walking. In PTL 2, there is a restriction to a composition of the captured image. Therefore, the method disclosed in PTL 2 is impractical for general usage.

PTL 3 and PTL 4 propose that the sensor and the image processing are used while combined in order to compensate the above defect. That is, there is proposed the method for selecting an angle component satisfying a certain standard from a plurality of candidates of the tilt angles using the sensor information. However, the accuracy of the output value of the sensor is inevitably degraded when the fluctuation component overlaps the output value of the sensor. Additionally, PTL 4 also discloses the method for improving the accuracy of the estimation of the tilt angle by previously removing tilt angle information from a non-structure that possibly becomes the fluctuation component during the estimation of the tilt angle. However, PTL 4 cannot exhibit the effect when information on the tilt angle relative to the structure becomes a fluctuation component as it is.

FIGS. 1A and 1B are views for explaining examples in which the tilt angle information from the structure becomes the fluctuation component. FIG. 1A illustrates the image captured with a wide-angle lens such as a fisheye lens. Generally, because a distortion exists in the captured wide-angle image, in order to obtain a correct result of the image processing, it is necessary to cut out a partial domain from the captured wide-angle image to produce the image having the small distortion by a calibration or a back calculation from a lens projection method. FIG. 1B illustrates an example of the image in which a neighborhood of a center of FIG. 1A is cut out to correct the distortion. As can be seen from the compositions of FIGS. 1A and 1B, a horizontal line of the structure extends from the front toward a depth direction, and the horizontal lines converge toward a disappearance point while being originally parallel lines. The number of vertical lines of the structure, which provides the correct tilt angle information, is relatively decreased compared with the horizontal line. Therefore, the correct tilt angle information is hardly detected. FIG. 2 illustrates an angle histogram of luminance gradient in each pixel of the image of FIG. 1B. In FIG. 2, a horizontal axis indicates an angle, and a vertical axis indicates a frequency. Assuming that the image is tilted by an angle θ, normally it is desirable that a frequency of bin of θ really takes a mode value. However, as can be seen from FIG. 2, a frequency of bin of the angle obtained from the horizontal line of the structure exceeds the frequency of bin of θ. Because the characteristic becomes particularly prominent by the wide-angle image, the characteristic cannot be solved by the method disclosed in PTL 4 in which the non-structure is previously removed.

In a method disclosed in PTL 5, a candidate of the disappearance point and an edge extracted from the image are connected by the line segment to produce a histogram in which the frequency of the tilt angle of the line segment satisfying a predetermined standard is accumulated, the histogram is obtained while the candidate of the disappearance point is continuously changed, and the candidate of the disappearance point indicating the largest frequency is determined as the disappearance point. When the disappearance point is determined, the horizontal line of the structure can be specified to remove the fluctuation component from the structure. However, in the method disclosed in PTL 5, there is also a possibility of removing the vertical line of the structure. It is also necessary to previously fix the predetermined standard, and the method of PTL 5 cannot be used when the tilt angle is unknown in capturing the image.

An object of the present invention is to enable the tilt angle to be estimated by selecting information that can be used to estimate the tilt angle of the image from an edge component obtained from the image and the tilt angle of the edge component and to correct the tilt of the image.

CITATION LIST

Patent Literature

PTL 1: Unexamined Japanese Patent Publication No. 2006-245726
PTL 2: Japanese Patent No. 3676360
PTL 3: Japanese Translation of PCT Publication No. 2009-001512
PTL 4: Japanese Translation of PCT Publication No. 2009-008174
PTL 5: Unexamined Japanese Patent Publication No. S63-106875

SUMMARY OF THE INVENTION

An image processing apparatus according to the present invention includes: an image acquisition unit; a tilt information calculator that calculates a plurality of pieces of tilt information to each pixel of an image acquired by the image acquisition unit in order to estimate a tilt of the image; an angle histogram generator that generates an angle histogram, which is of a frequency distribution of each tilt angle, using the plurality of pieces of tilt information calculated by the tilt information calculator; a tilt information-position recording unit that records correspondences between the plurality of pieces of tilt information and positions on the image in which the plurality of pieces of Lilt information are acquired; a Lilt information distribution degree calculator that calculates a distribution degree of the tilt information from the plurality of pieces of tilt information and the positions of the plurality of pieces of tilt information; a fake information determination unit that determines the tilt information that can be used in tilt estimation and the tilt information that cannot be used in the tilt estimation in the plurality of pieces of tilt information from the distribution degree of the tilt information; a peak detector that extracts a maximum value or a maximum of the usable angle histogram based on a determination result of the fake information determination unit; a tilt estimation unit that estimates the tilt angle of the image from the tilt angle indicated by the maximum value or the maximum, which is detected by the peak detector; and an image correction unit that corrects the tilt of the image with the estimated tilt angle.

According to the above configuration, when the tilt angle of the image is estimated, the information that can be used to estimate the tilt angle can be selected from the plurality of edges and the tilt angles thereof, which are extracted from the image.

In the image processing apparatus, preferably a line segment in the image is calculated along with the tilt angle thereof in the plurality of pieces of tilt information used to estimate the tilt of the image, and the tilt information calculator performs the calculation processing at predetermined pixel intervals in a predetermined range of the image.

In the image processing apparatus, preferably luminance information in the image is substituted in a predetermined arithmetic expression to perform calculation, and a luminance gradient of the luminance information is obtained to calculate the plurality of pieces of tilt information used to estimate the tilt of the image, and the tilt information calculator performs the calculation processing at predetermined pixel intervals in a predetermined range of the image.

According to the above configuration, a processing load of the tilt information calculator or the processing loads from the tilt information calculator can be reduced.

In the image processing apparatus, preferably the angle histogram generator weights each piece of tilt angle information such that weighting is increased with increasing length of the line segment detected from the image.

In the image processing apparatus, preferably the angle histogram generator weights each piece of tilt angle information such that weighting is increased as the luminance gradient detected from the image is closer to perpendicularity.

The tilt angle can rightly be estimated and corrected by increasing the weights of the reliable horizontal line component, vertical line component, and luminance gradient.

In the image processing apparatus, preferably the distribution degree of the tilt information is a variance or a standard deviation for the position at the identical tilt angle or each tilt angle existing in the predetermined range.

In the image processing apparatus, preferably the fake information determination unit compares a calculation result of the tilt information distribution degree calculator to a previously-set value to determine whether the identical tilt angle or the tilt angle existing in the predetermined range is fake information, and the tilt estimation unit selects the tilt angle, which is determined to be not the fake information by the fake information determination unit, in the pieces of tilt information satisfying a standard previously fixed by the angle histogram generator.

In the image processing apparatus, preferably the tilt estimation unit selects the tilt angle having the highest frequency in the tilt, angles, which are determined to be not the fake information by the fake information determination unit, in the tilt angles having the frequencies satisfying a standard previously fixed by the angle histogram generator.

Preferably the image processing apparatus further includes an image correction unit that corrects the image according to the tilt information output from the tilt estimation unit.

According to the above configuration, the image can be corrected based on the tilt information estimated by the tilt estimation unit.

Preferably the image processing apparatus further includes: an image accumulation unit in which the acquired image is stored; and a panoramic image producing unit that selects and reads at least two images from the images stored in the image accumulation unit and produces a panoramic image by combining the images, wherein the tilt information calculator performs predetermined calculation to each pixel of the panoramic image, and extracts a plurality of pieces of information in order to estimate the tilt of the panoramic image.

According to the above configuration, because locality of each tilt angle of the line segment or the pixel in the image becomes clearer, estimation accuracy of the tilt angle is improved.

In the image processing apparatus, preferably the tilt estimation unit estimates the tilt angle of the panoramic image, and calculates the tilt angle of each of at least the two images constituting the panoramic image using a relative rotation angle between at least the two images constituting the panoramic image.

According to the image processing apparatus of the present invention, when the tilt angle of the image is estimated, even in the image that is captured using, for example, a wide-angle lens and in which the horizontal component of the structure becomes dominant, the information indicating the tilt angle of the image can be selected, and the tilt angle can rightly be estimated and corrected.

BRIEF DESCRIPTION OF DRAWINGS

FIG. 6A is a view illustrating a coefficient matrix that is used in a Sobel filter.

FIG. 6B is a view illustrating the coefficient matrix that is used in the Sobel filter.

FIG. 8 is a view explaining examples of an edge that is extracted from the image and a format that records a parameter of the edge.

FIG. 11A is a view explaining an example in which a panoramic image is generated from a plurality of images and an advantage of using the panoramic image in the second exemplary embodiment of the present invention.

FIG. 11B is a view explaining an example in which the panoramic image is generated from the plurality of images and an advantage of using the panoramic image in the second exemplary embodiment of the present invention.

FIG. 13 is a view illustrating examples of output values of three axes of an acceleration sensor.

FIG. 14 is a view illustrating examples of output values in an x-direction and a y-direction when a tilt is detected with the acceleration sensor.

DETAILED DESCRIPTION OF THE INVENTION

Hereinafter configurations and operations of exemplary embodiments of the present invention will be described with reference to the drawings.

First Exemplary Embodiment

Figure 3:
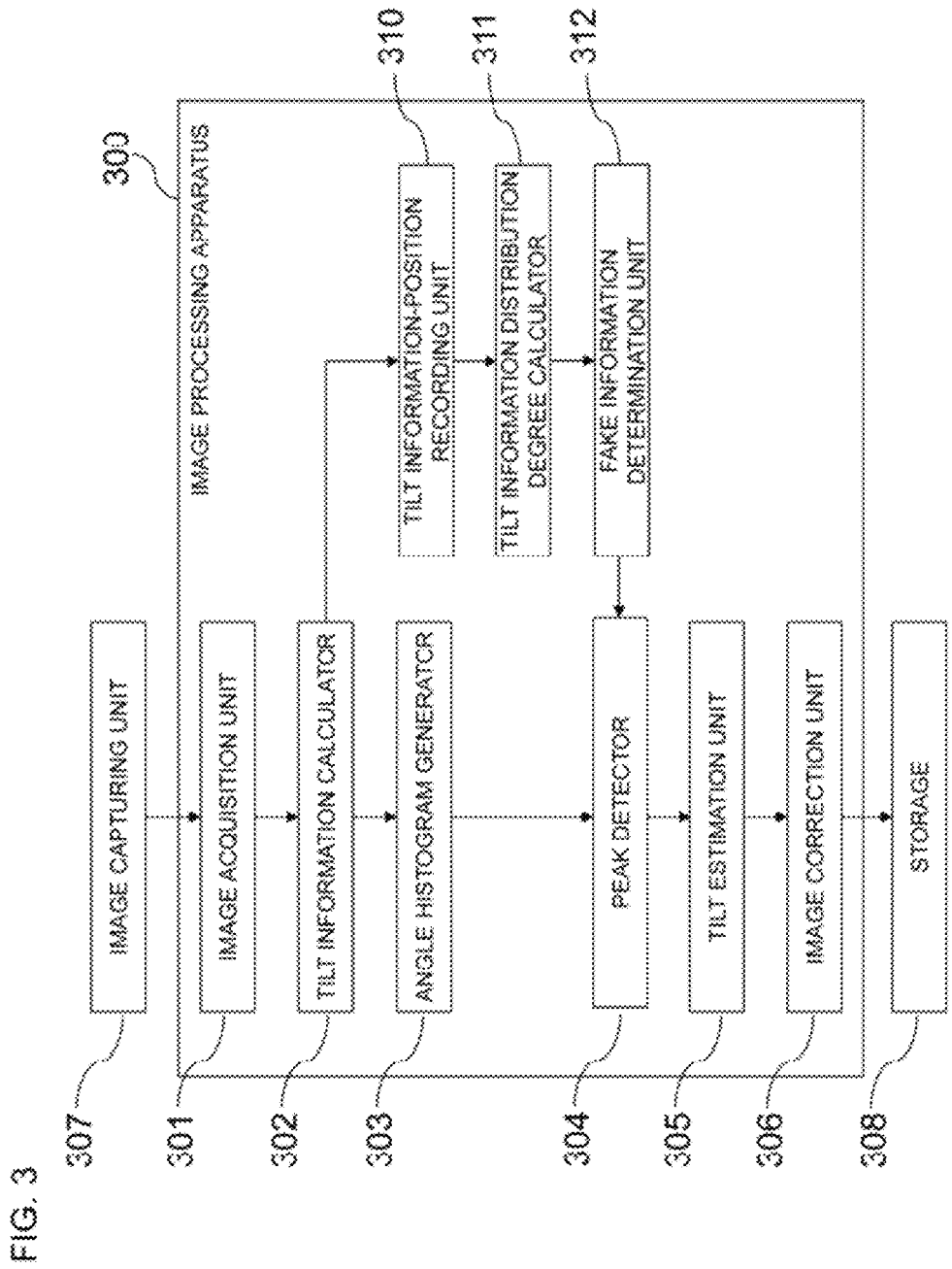
FIG. 3 is a view illustrating a configuration of an image processing apparatus according to a first exemplary embodiment of the present invention.
Figure 4:
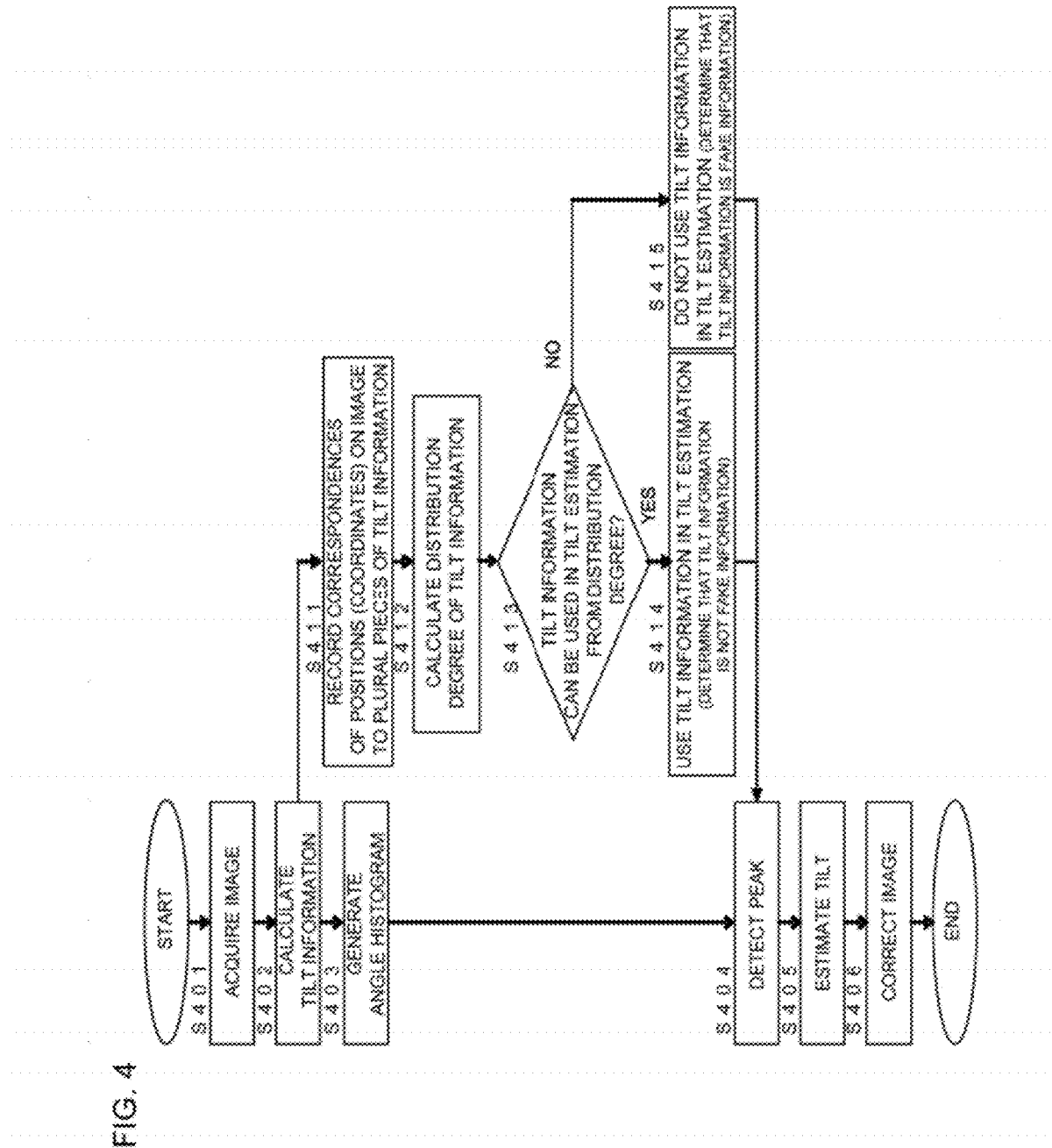
FIG. 4 is a flowchart illustrating an image processing method according to the first exemplary embodiment of the present invention.

FIG. 3 is a view illustrating a configuration of an image processing apparatus according to a first exemplary embodiment of the present invention. FIG. 4 is a flowchart illustrating an image processing method according to the first exemplary embodiment of the present invention.

Image acquisition unit 301 takes image data, which is captured with image capturing unit 307, in image processing apparatus 300, and transmits the image data to tilt information calculator 302 (S401). Tilt information calculator 302 calculates tilt information with respect to the taken image (S402). Examples of the techniques of calculating the tilt information include a method, in which a gray scale transformation is applied to the image, vertical and horizontal Sobel filters are activated in each pixel, and a gradient vector is calculated by combining the results, and a method, in which a Hough transform is activated to extract a line segment from the image and a length and a tilt angle of the line segment are calculated. However, the present invention is not limited to the examples of the techniques.

For example, when the line segment is extracted from the image, the image is divided into a plurality of small domains, and whether the line segment or pixel having the tilt of a determination target is included in each small domain may be checked (that is, whether the line segment or pixel having the tilt of the determination target is included in a predetermined pixel interval within a predetermined range may be checked). The configuration can reduce a processing load of tilt information calculator 302 or processing loads from tilt information calculator 302.

Figure 5:
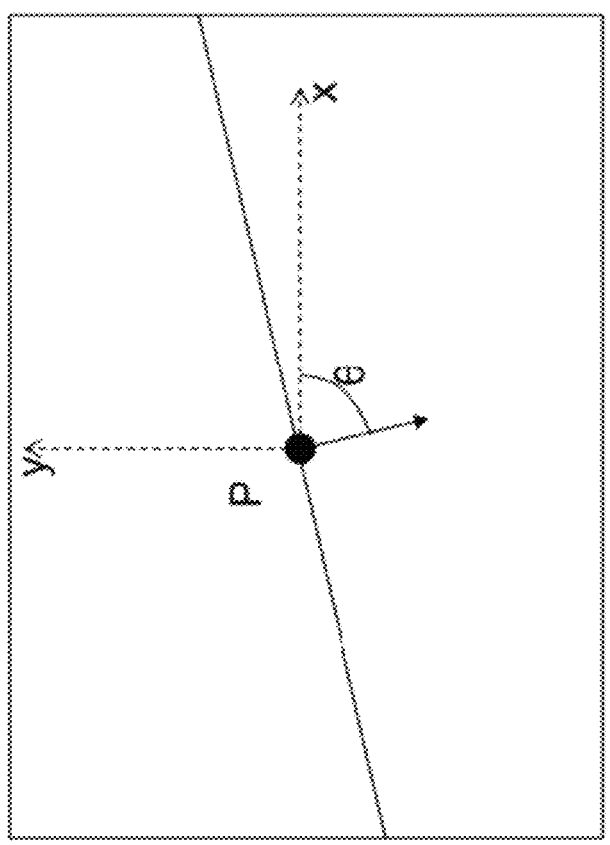
FIG. 5 is a view explaining a luminance gradient at a point on a line segment.
Figures 6A, 6B:
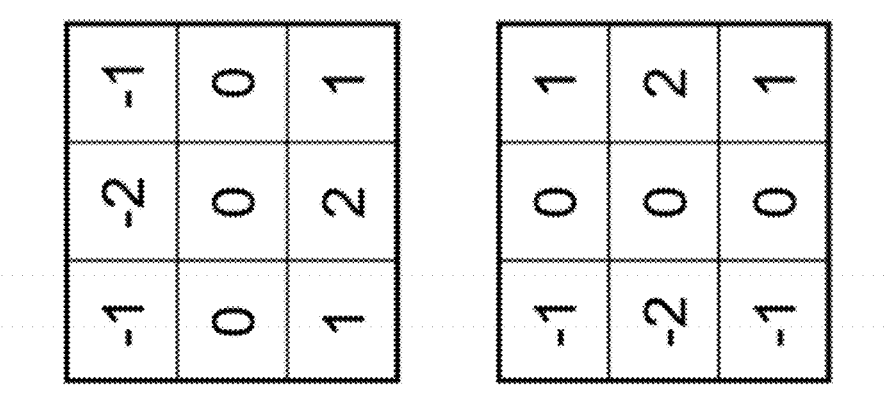

Calculation of a gradient vector will be described with reference to FIGS. 5, 6A, and 6B. In FIG. 5, assuming that I(P) is a pixel value of the image in position P, and that dx and dy are contrast changes in an x-direction and a y-direction in position P, respectively, the following equation holds.

$$dx = \partial I(P)/\partial x, \quad dy = \partial I(P)/\partial y$$

At this point, assuming that θ is a direction of the contrast change, the following equation holds.

$$\theta = \tan^{-1}(dy/dx)$$

Figure 7A:
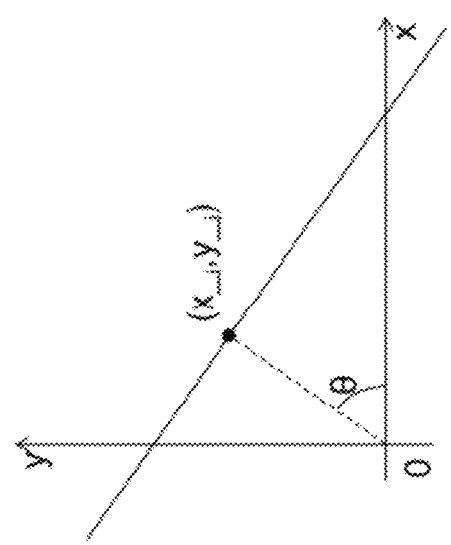
FIG. 7A is a view explaining a parameter that characterizes the line segment in a Hough transform.

The equation corresponds to the direction of the gradient vector. The Sobel filter illustrated in FIGS. 6A and 6B is used to obtain dx and dy. FIGS. 6A and 6B illustrate filter elements that measure the contrast changes in the x-direction and the y-direction, respectively. The detection of the line segment using the Hough transform will be described below with reference to FIGS. 7A and 7B. In FIG. 7A, a straight line passing through a point (x_i,y_i) satisfies the following equation.

$$\rho = x\_i \cdot \cos\theta + y\_i \cdot \sin\theta$$

Where ρ is a distance between the straight line and an origin, and θ is an angle formed by a line perpendicular to the straight line from the origin and an x-axis.

Figure 7B:
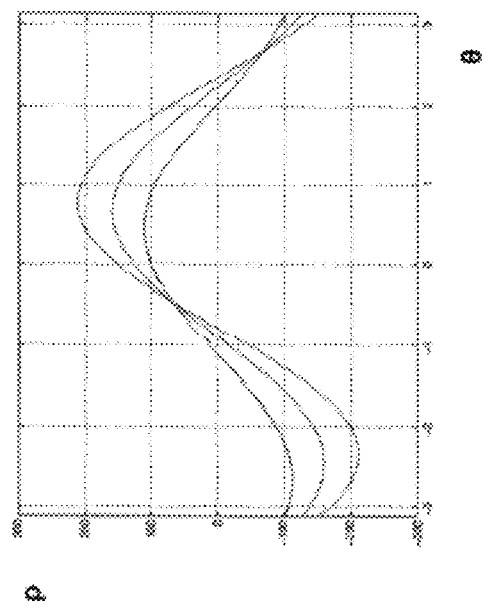
FIG. 7B is a view explaining the parameter that characterizes the line segment in the Hough transform.

The above equation means that a group of straight lines passing through the point (x_i,y_i) corresponds to one curved line in FIG. 7B. When the similar correspondence is performed to a plurality of points existing on the same straight line, the acquired plural curved lines intersect at one point, and the intersection point (ρ,θ) indicates the straight lines passing through the points. That is, the number of distances ρ is counted while attention is focused on a certain angle θ, which allows the number of line segments having the tilt θ to be acquired.

Figure 1A:
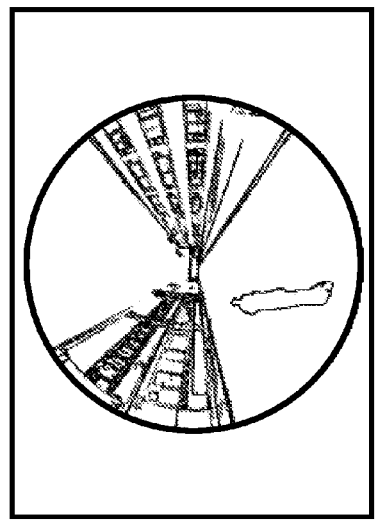
FIG. 1A is a view illustrating an image captured with a wide-angle lens in order to explain an example in which information on a tilt angle relative to a structure becomes a fluctuation component.
Figure 1B:
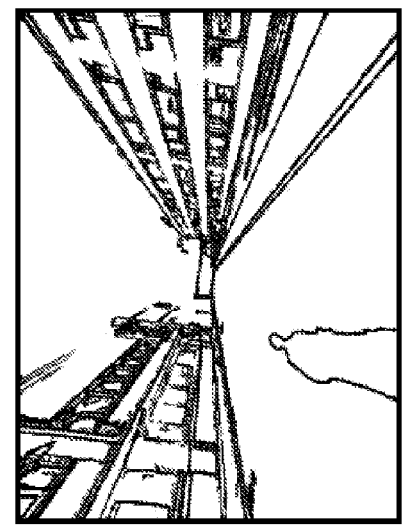
FIG. 1B is a view illustrating an image in which a neighborhood of a center of FIG. 1A is cut out to remove a distortion in order to explain an example in which the information on the tilt angle relative to the structure becomes the fluctuation component.
Figure 2:
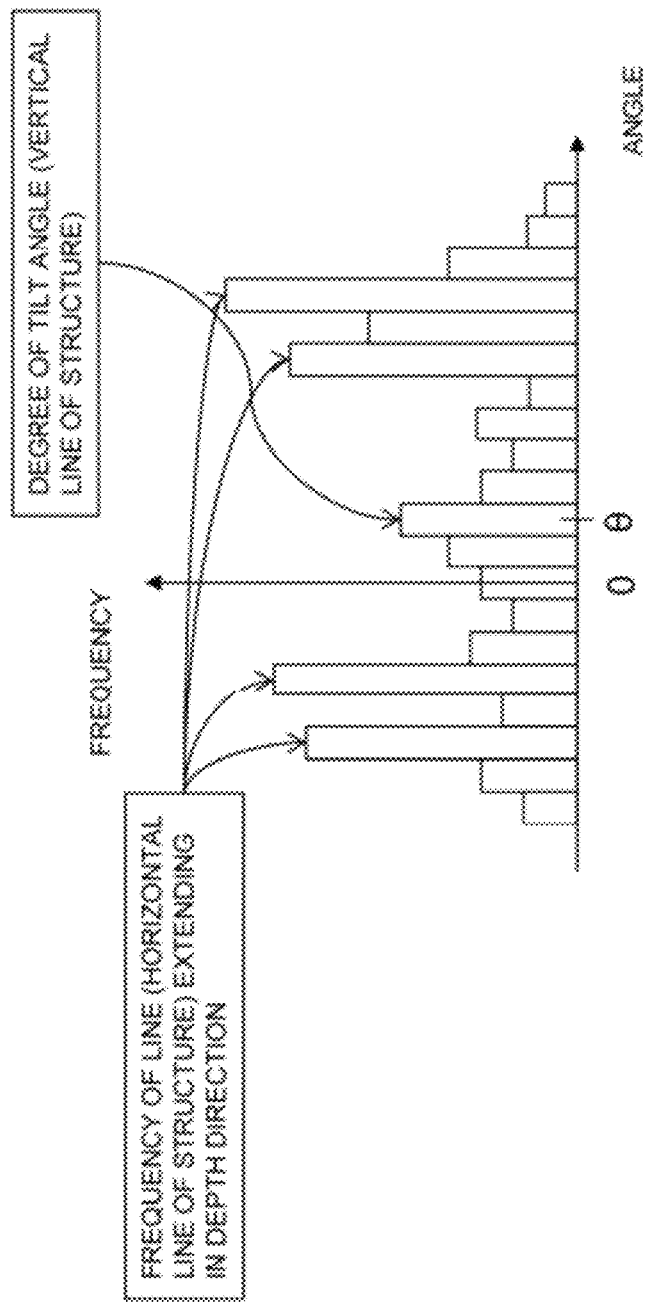
FIG. 2 is a view illustrating an angle histogram of the image of FIG. 1B.

Angle histogram generator 303 performs processing of accumulating the gradient vector having the same directional component in the gradient vectors or processing of adding the line segment having the same directional component in the line segments obtained by the Hough transform, thereby generating an angle histogram (S403). The angle histogram becomes an index expressing "the number of edges having a certain angle direction". Generally, when only the structure is captured while the image is not tilted (in the case of no distortion), the angle histograms of 0 degree and 90 degrees have strong peaks because the number of horizontal line components or the number of vertical line components is increased. When the image is tilted by θ as illustrated in FIGS. 1A and 1B, the angle histogram in which the angle histogram having no tilt is translated by θ is obtained as illustrated in FIG. 2.

In the first exemplary embodiment, the luminance gradient is obtained in each pixel by way of example. However, the present invention is not limited to the first exemplary embodiment. For example, when the luminance gradient is obtained from the image, the image is divided into a plurality of small domains to acquire the tilt angle in each small domain, and whether the pixel having the same tilt angle exists in directions of ±90° relative to the tilt angle may be checked (that is, whether the pixel having the same tilt angle exists in directions of ±90° relative to the tilt angle, which is acquired at predetermined pixel intervals within a predetermined range, may be checked). The configuration can reduce the processing load of tilt information calculator 302 or the processing loads from tilt information calculator 302.

In the tilt angle estimation performed by the conventional image processing, peak detector 304 searches the angle indicating the maximum value of the angle histogram, tilt estimation unit 305 directly determines the angle indicating the maximum value of the angle histogram as the tilt angle of the image, and image correction unit 306 performs processing of correcting the tilt angle. Alternatively, peak detector 304 selects several maximums including the maximum value, tilt estimation unit 305 analytically calculates the maximum value after calculating an envelope such that the envelope smoothly connects the maximums by interpolation of a polynomial, a least-square method, a gradient method, and the like, and image correction unit 306 corrects the tilt with the maximum value as the tilt angle of the image. Generally, in image correction unit 306, a rotation is corrected by an affine transform. In the present invention, the estimation of the tilt angle from the angle histogram and the correction by the affine transform are similarly performed.

Tilt information-position recording unit 310 records the tilt information obtained by tilt information calculator 302 and the position in the image of the tilt information while the tilt information and the position are correlated with each other (S411). FIG. 8 illustrates an example in which the tilt information and coordinates representing the position in the image of the tilt information are recorded while the tilt information and the position are correlated with each other. The position in the image of the tilt information is not limited to the coordinate, but the position in the image may be vector data as long as the position can be expressed. For example, an frame ID, an edge ID, an x/y-direction edge component, an angle, edge intensity, and a coordinate are recorded while correlated with the position in the image of the tilt information. Whether the edge is obtained from the structure or a feature quantity obtained in extracting a feature point may be added to a database, or the database may be constructed from a minimum configuration including only the edge ID, the x/y-direction edge component, and the coordinate, or only the edge ID, the angle, and the coordinate. Tilt information distribution degree calculator 311 extracts the plurality of pieces of tilt information that have the angles existing within a predetermined angle range from the database, and calculates a variance or a standard deviation of the coordinates of the pieces of tilt information (S412). Assuming that V_x/y is the variance of the coordinate in the x/y-direction and that σ_x/y is the standard deviation in the x/y-direction, σ and a can be expressed by the following equation.

$$V\_x = (1/n)\Sigma(x - x\_n)^2, \; V\_y = (1/n)\Sigma(y - y\_n)^2 \quad \text{(Equation 1)}$$

$$\sigma\_x = \sqrt{(V\_x)}, \; \sigma\_y = \sqrt{(V\_y)} \quad \text{(Equation 2)}$$

Where x and y are average values of the coordinate and n is the number of edges of the coordinate. The tilt information registered in the database belongs to one of sets of angle ranges, and the standard deviation or the variance of the coordinates is obtained for all the sets. There is no limitation to the method for obtaining a degree of the variance of a certain set.

Figure 9B:
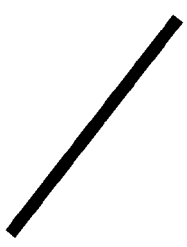
FIG. 9B is a view illustrating the difference in spatial distribution characteristic between the vertical line and the horizontal line of the structure.
Figure 9D:
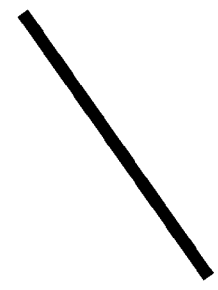
FIG. 9D is a view illustrating the difference in spatial distribution characteristic between the vertical line and the horizontal line of the structure.
Figure 9A:
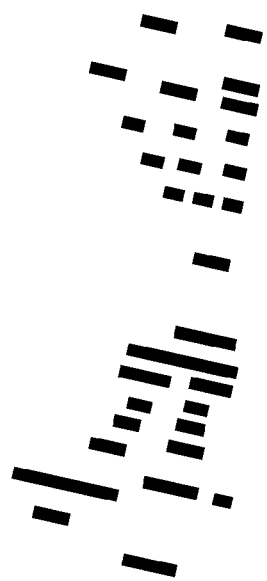
FIG. 9A is a view illustrating a difference in spatial distribution characteristic between a vertical line and a horizontal line of the structure.
Figure 9C:
FIG. 9C is a view illustrating the difference in spatial distribution characteristic between the vertical line and the horizontal line of the structure.

A geometrical disposition characteristic on the image of the vertical line of the structure that provides the correct tilt angle and the horizontal line of the structure that becomes fake information will be described. FIGS. 9A to 9D illustrate the line segment or the pixel, which has the same tilt angle and is extracted from the image of FIG. 1B. FIG. 9A illustrates the vertical line of the structure; As can be seen from FIG. 9A, the vertical lines of the structure are disposed while widely dispersed on the image. On the other hand, the horizontal line of the structure is extracted in FIGS. 9B to 9D. The horizontal lines of the structures become the same tilt angle on the image, when the horizontal lines are identical (FIG. 9D), or when horizontal line is accidentally matched with the tilt angle of the horizontal line of the structure located on an opposite side to a disappearance point (FIG. 9B or FIG. 9C). As can be seen from FIGS. 9B to 9D, the horizontal line of the structure emerges at two points at a maximum, the horizontal lines of the structure are distributed in a quite narrow range on the image. When locality of the horizontal line of the structure is detected, whether the horizontal line of the structure is used to estimate the tilt angle of the image can be determined.

Fake information determination unit 312 utilizes the feature of the edge of the structure to determine the locality of the target tilt angle, thereby determining whether the horizontal line of the structure is the fake information (S413 to S415). As to the specific method for determining the locality, equation 1 or equation 2 is obtained after the coordinate that is rotated by the tilt angle of the edge is calculated, and a characteristic, in which the variance or the standard deviation of the set of tilt angles of FIG. 9A has a certain level of magnitude in both the x-direction and the y-direction after the rotation while the variance or the standard deviation of the set of tilt angles having the locality of FIGS. 9B to 9D has a quite small value in the x-direction or the y-direction after the rotation, is utilized. It is also conceivable to adopt the method in which the image is divided into the plurality of small domains and whether the line segment or pixel having the tilt of the determination target is included in each small domain is checked. Whether the pixel having the same tilt angle exists in the directions of ±90° relative to the tilt angle acquired in obtaining the luminance gradient may be checked or the result of the Hough transform may directly be used. There is no limitation to the method for determining the locality, but any method may be adopted as long as the locality of the feature quantity can be determined in the image.

Peak detector 304 and tilt estimation unit 305 receive information on the tilt angles providing the plurality of maximums of the angle histograms or the tilt angle providing a mode value in angle histogram generator 303 and the determination result in each tilt angle by fake information determination unit 312. At this point, for example, the angle providing the mode value in the tilt angles, which are determined to be not the fake information, is set to a tilt estimate angle, and the information is transmitted to image correction unit 306 (S404 and S405). For example, image correction unit 306 performs the affine transform to rotate the whole image, which allows a rotational transfer amount between the images to be corrected. At this point, when the tilt estimate angle set by the above method is largely different from the tilt angle estimated at the last minute, tilt estimation unit 305 may regard the angle, which is estimated at the last minute while the estimation result is ignored, as the tilt angle. Alternatively, an error allowable range (for example, ±1°) is properly set to the tilt angle, which is estimated at the last minute by tilt estimation unit 305, the tilt angle providing the mode value is selected from the tilt angles determined to be not the fake information with in the error allowable range, and the selected tilt angle may be used as the tilt estimate angle. In both the cases, finally image correction unit 306 rotates the whole image to complete the correction of the target image (S406).

After stored in storage 308, the corrected image may be displayed on a monitor device (not illustrated) or stored as a file in an external storage device (not illustrated). The corrected image may be transmitted through a network.

The configuration and the operation of image processing apparatus 300 of the first exemplary embodiment of the present invention are described above.

Angle histogram generator 303 may weight each piece of tilt angle information such that the weighting is increased with increasing length of the line segment detected from the image. This is because a probability of the reliable horizontal line or vertical line is enhanced with increasing length of the line segment.

Alternatively, angle histogram generator 303 may weight each piece of tilt angle information such that the weighting is increased as the luminance gradient detected from the image is brought closer to perpendicularity.

No piece of processing may be performed to the image that does not possess the information necessary to estimate the tilt angle. For example, in the image in which a person or a natural object is fully captured, the tilt information is not calculated because the structure information does not exist. In such cases, because sensitivity of the tilt of the image is visually decreased (degradation of quality is hardly sensed even if the image is tilted), the correction may be cancelled rather than the correction is performed using the unstable, low-accuracy tilt estimate angle extracted from the person or the natural object.

A buffer in which the estimated tilt angle is stored may be provided. The estimate tilt angle calculated in time series is stored in the buffer, and the tilt angle may be estimated by performing interpolation using the successful result of the estimation of the tilt angle before and after the tilt angle of one image cannot be calculated. In the device such as a movie camera that continuously captures the image, because generally the tilt angle of the image changes continuously, the tilt angle of the target image can also be estimated using extrapolation processing from the past estimation results of the tilt angle.

Second Exemplary Embodiment

Figure 10:
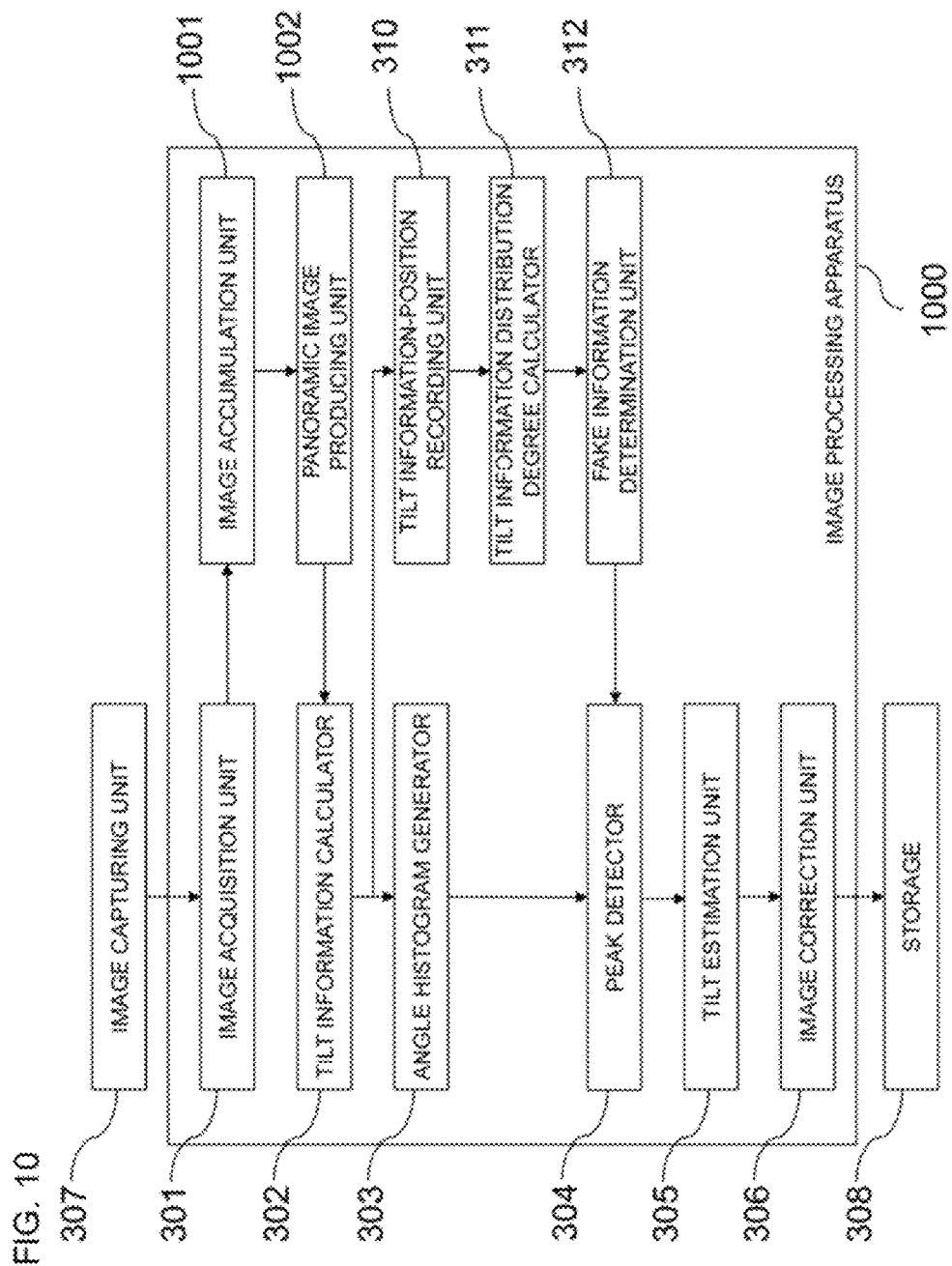
FIG. 10 is a view illustrating a configuration of an image processing apparatus according to a second exemplary embodiment of the present invention.

FIG. 10 is a view illustrating a configuration of an image processing apparatus according to a second exemplary embodiment of the present. invention. In FIG. 10, the same component as that of FIG. 3 is designated by the same reference mark, and the description is omitted.

Image accumulation unit 1001 records the image data acquired by image acquisition unit 301 by a predetermined time width. It is assumed that image accumulation unit 1001 has the same configuration as FIFO. Panoramic image producing unit 1002 sequentially reads the image data recorded in image accumulation unit 1001, and produces a panoramic image. A well-known method may be adopted as a method for producing the panoramic image. In producing the panoramic image, it is assumed that the relative tilt angle between the plurality of pieces of image data that becomes the original data is removed. The panoramic image is transmitted to tilt information calculator 302, and the estimation of the tilt angle and the tilt correction of the panoramic image are performed by the same method as the first exemplary embodiment.

The locality becomes clearer in each line segment in the image or each tilt angle of the pixel by producing the panoramic image. FIGS. 11A and 11B illustrate examples of the panoramic images. FIG. 11A illustrates one panoramic image that is produced by combining four images. In FIG. 11A, overlapping portions of image 1 to image 4 are detected, and image 1 to image 4 are combined such that deviations of the overlapping portions are eliminated, thereby producing the one panoramic image. FIG. 11B illustrates an example in which the line segment or the pixel has the same tilt angle and is extracted from the panoramic image. For example, like image 3 of FIG. 11B, sometimes there is a small difference in locality of the spatial distribution between the vertical line of the structure indicated by a solid line and the horizontal line of the structure indicated by a dotted line. In such cases, although the fake information is hardly determined in the present invention, it is found that the locality becomes prominent by producing the panoramic image.

Therefore, even if the fake information cannot be determined in the single image, the panoramic image is produced to reveal the fake information in the panoramic image, so that the tilt angle can be estimated. The tilt angle of each image can be fixed by feeding back the fake information on the panoramic image to the single image. The tilt angle relative to a reference image or the tilt angle relative to an adjacent image is stored in panoramic image producing unit 1002 when the panoramic image is produced, and the relative angle is added to or subtracted from the result obtained by tilt estimation unit 305, thereby correcting the tilt angle in each of the plurality of images.

The configuration and the operation of image processing apparatus 1000 of the second exemplary embodiment of the present invention are described above.

Third Exemplary Embodiment

Figure 12:
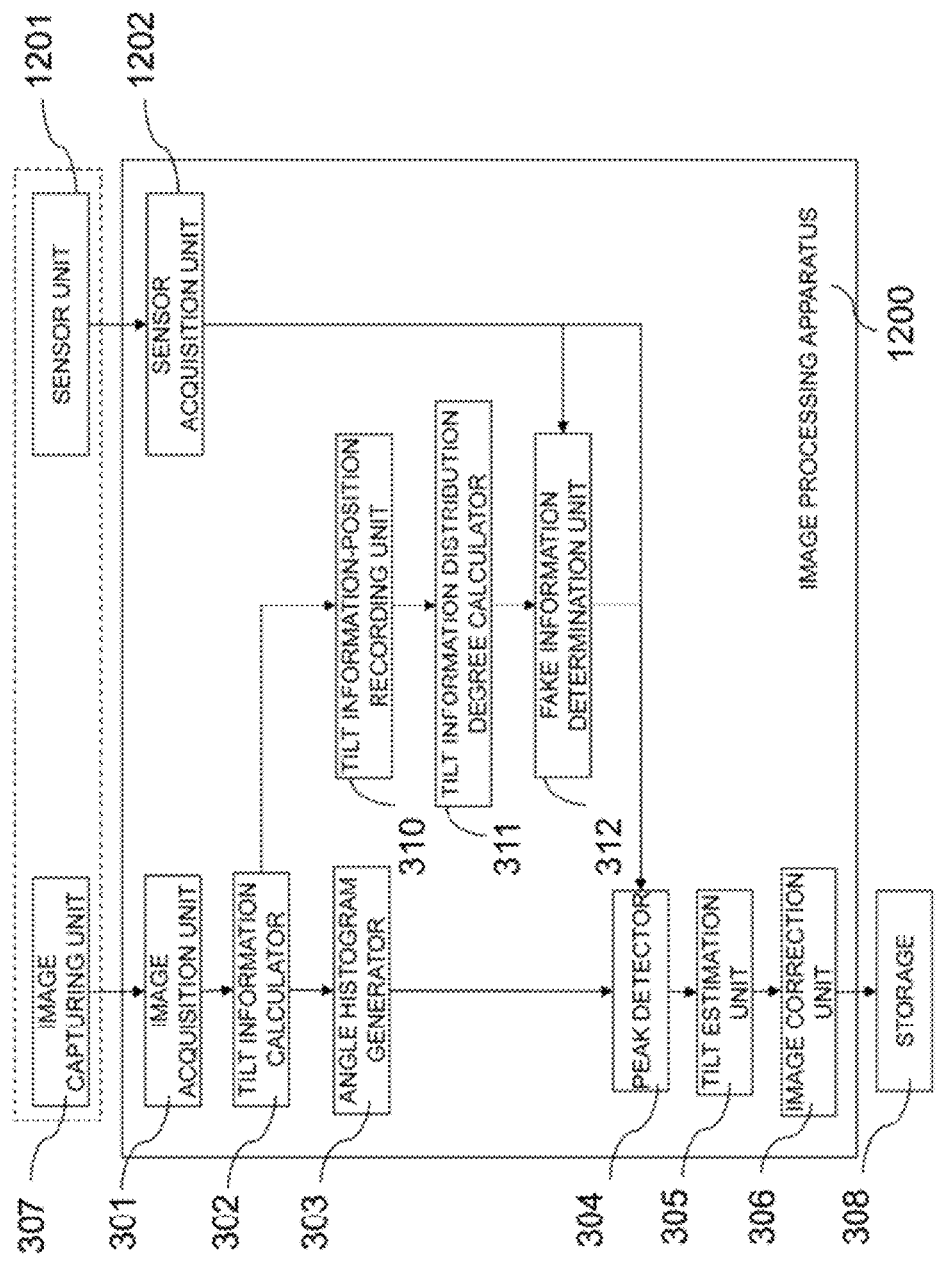
FIG. 12 is a view illustrating a configuration of an image processing apparatus according to a third exemplary embodiment of the present invention.

FIG. 12 is a view illustrating a configuration of an image processing apparatus according to a third exemplary embodiment of the present invention. In FIG. 12, the same component as that of FIG. 3 is designated by the same reference mark, and the description is omitted.

Sensor unit 1201 is placed inside or outside image capturing unit 307, and measures and outputs motion of image capturing unit 307 in a predetermined period. FIG. 13 illustrates an example of an output of the sensor unit 1201. Generally the motion of image capturing unit 307 may be measured in synchronization with the image capturing of image capturing unit 307. Sensor unit 1201 includes an acceleration sensor, a gyrosensor, and an orientation sensor and the like. Ideally, although sensor unit 1201 has three measurement axes so as to be able to completely measure the motion of image capturing unit 307, it is not always necessary that sensor unit 1201 have three measurement axes. In image processing apparatus 1200, the image data and sensor data are dealt with so as to synchronize with each other. Sensor acquisition unit 1202 processes the acquired sensor data, and calculates auxiliary information in order to calculate the estimate tilt angle. Specifically, filtering can be performed to a sensor value to extract a desired band component, or a motion direction can be estimated from behaviors of the group of sensors using a discriminator that is previously made by reinforcement learning. The pieces of information are transmitted to fake information determination unit 312 or tilt estimation unit 305. Fake information determination unit 312 estimates the vertical direction of the image using the information from sensor acquisition unit 1202, and determines which the tilt angle of the line segment or pixel extracted from the image has a higher probability of the vertical line of the structure. Specifically, an inner product of a unit vector indicating the vertical direction acquired from the sensor information and a unit having the tilt angle extracted from the image is obtained to make a determination that the result of the inner product close to 1 (or 0, in the case that the tilt angle is expressed by a normal vector) has the higher probability of the vertical line of the structure. For example, tilt estimation unit 305 roughly estimates the tilt angle of image capturing unit 307 using the acceleration sensor and the gyrosensor, and the tilt angle of image capturing unit 307 can be set to a constraint condition when tilt estimation unit 305 calculates the estimate tilt angle. FIG. 14 illustrates examples of acceleration changes in the x-direction and the y-direction. FIG. 14 illustrates the examples in which acceleration is acquired in each of the x-direction and the y-direction at times (a), (b), and (c) and mapped in a two-dimensional plane to obtain a vector. Because the vectors (a), (b), and (c) indicate the tilt angle relative to the vertical direction during the image capturing of image capturing unit 307. the image is rotated such that the vectors (a), (b), and (c) are oriented toward the vertical direction, so that the tilt can be removed. When a user captures the image while walking, sometimes the sensor value becomes incorrect due to an inertial noise or sensitivity of another axis. In such cases, it is necessary to perform the correction by the method of the present invention. At this point, the effect of the present invention can further be enhanced by inputting the tilt direction measured by the sensor to tilt estimation unit 305. Because there is a high probability that the direction indicated by the sensor is the real vertical direction of the image, a predetermined range centering around the direction indicated by the sensor is set, and a mode value of a frequency within the set range is selected as the tilt angle from the angle histograms obtained by angle histogram generator 303. The set range may be a fixed value or a variable value. In the case of the variable value, the range may be changed according to magnitude of the motion, namely, amplitude or stability (for example, the variance within a predetermined time range can be used) of the sensor. At this point, the determination that a small error is generated in the output value of the sensor is made to narrow the range in the case of the small motion, and the determination that the large error is generated is made to widen the range in the case of the large motion. The change may be continuous, or the change may be discrete values of at least two stages. Alternatively, when the information necessary to calculate the estimate angle is not acquired from the image, the estimate angle may be calculated from the past estimation result or the previous or subsequent estimation result and the sensor value. In this case, an assumption that the tilt angle is continuously changed in the image continuously captured in a time series is applied to set a permissible value to an already estimated angle, the already estimated angle is used as the correction value when the sensor value falls within the permissible value.

The configuration and the operation of image processing apparatus 1200 of the third exemplary embodiment of the present invention are described above.

Modifications

Although the exemplary embodiments of the present invention are described above, obviously the present invention is not limited to the above exemplary embodiments. The following modifications are also included in the present invention.

(1) Specifically, each apparatus is a computer system including a microprocessor, a ROM, a RAM, a hard disk unit, a display unit, a keyboard, and a mouse. A computer program is stored in the RAM or the hard disk unit. The microprocessor is operated according to the computer program, whereby each apparatus exerts the function. In order to achieve a predetermined function, the computer program is implemented by combining a plurality of command codes indicating a command to the computer.

(2) Some of or all the components constituting each apparatus may be made by one system LSI (Large Scale Integration). The system LSI is a super-multifunctional LSI in which a plurality of component units are integrated and produced on one chip. Specifically, the system LSI is a computer system including the microprocessor, the ROM, and the RAM. The computer program is stored in the RAM. The microprocessor is operated according to the computer program, whereby the system LSI exerts the function.

(3) Some of or all the components constituting each apparatus may be made by an IC card that is detachably attached to each apparatus or a single module. The IC card or the module is the computer system including the microprocessor, the ROM, and the RAM. The IC card or the module may include the super-multifunctional LSI. The microprocessor is operated according to the computer program, whereby the IC card or the module exerts the function. The IC card or the module may have a tamper-resistant property.

(4) The present invention may be the above-described methods. The methods may be the computer program implemented by the computer, or the methods may be digital signals including the computer program.

In the present invention, the computer program or the digital signals may be recorded in a computer-readable recording medium such as a flexible disk, a hard disk, a CD-ROM, an MO, a DVD, a DVD-ROM, a DVD-RAM, a BD (Blu-ray Disc), and a semiconductor memory. The present invention may be the digital signals recorded in the recording mediums.

In the present invention, the computer program or the digital signals may be transmitted through an electric communication line, a wireless or wired communication line, a network typified by the Internet, and data broadcasting.

The present invention may be the computer system including the microprocessor and the memory, the computer program is stored in the memory, and the microprocessor is operated according to the computer program.

The program or the digital signals is transferred while recorded in the recording medium, or the program or the digital signals is transferred through the network, whereby the program or the digital signals may be implemented by another independent computer system.

(5) the exemplary embodiments and the modifications may be combined.

The invention claimed is:

1. An image processing apparatus comprising:
a non-transitory memory storing a program; and
a hardware processor that executes the program and causes the image processing apparatus to:
calculate a plurality of pieces of tilt information to each pixel of an image acquired in order to estimate a tilt of the image;
generate an angle histogram, which is of a frequency distribution of each tilt angle, using the plurality of pieces of tilt information calculated;
record correspondences between the plurality of pieces of tilt information and positions on the image in which the plurality of pieces of tilt information are acquired;
calculate a distribution degree of the tilt information from the plurality of pieces of tilt information and the positions of the plurality of pieces of tilt information;
determine the tilt information that can be used in tilt estimation and the tilt information that cannot be used in the tilt estimation in the plurality of pieces of tilt information from the distribution degree of the tilt information;
extract a maximum value or a maximum of the usable angle histogram based on a determination result of tilt information; and estimate the tilt angle of the image from the tilt angle indicated by the maximum value or the maximum, which is detected by the peak detector, wherein the distribution degree of the tilt information is a variance or a standard deviation for the position at the identical tilt angle or each tilt angle existing in the predetermined range.

2. The image processing apparatus according to claim 1, wherein a line segment in the image is calculated along with the tilt angle thereof in the plurality of pieces of tilt information used to estimate the tilt of the image, and the hardware processor performs the calculation processing at predetermined pixel intervals in a predetermined range of the image.

3. The image processing apparatus according to claim 1, wherein luminance information in the image is substituted in a predetermined arithmetic expression to perform calculation, and a luminance gradient of the luminance information is obtained to calculate the plurality of pieces of tilt information used to estimate the tilt of the image, and the hardware processor performs the calculation processing at predetermined pixel intervals in a predetermined range of the image.

4. The image processing apparatus according to claim 3, wherein the hardware processor performs the calculation processing by checking whether the pixel having the identical tilt angle exists in directions of ±90° relative to the tilt angle obtained from the luminance gradient in the predetermined range of the image.

5. The image processing apparatus according to claim 2, wherein the hardware processor weights each piece of tilt angle information such that weighting is increased with increasing length of the line segment detected from the image.

6. The image processing apparatus according to claim 3, wherein the hardware processor weights each piece of tilt angle information such that weighting is increased as the luminance gradient detected from the image is closer to perpendicularity.

7. The image processing apparatus according to claim 1, wherein the hardware processor compares a calculation result of the tilt information to a previously-set value to determine whether the identical tilt angle or the tilt angle existing in the predetermined range is fake information, and selects the tilt angle, which is determined to be not the fake information, in the pieces of tilt information satisfying a standard previously fixed.

8. The image processing apparatus according to claim 1, wherein the hardware processor selects the tilt angle having the highest frequency in the tilt angles, which are determined not to be fake information, in the tilt angles having the frequencies satisfying a standard previously fixed.

9. The image processing apparatus according to claim 1, further comprising an image correction unit that corrects the image according to the tilt information output.

10. The image processing apparatus according to claim 1, further comprising:

an image accumulation unit in which the acquire image is stored; and a panoramic image producing unit that selects and reads at least two images from the images stored in the image accumulation unit and produces a panoramic image by combining the images, wherein the hardware processor performs predetermined calculation to each pixel of the panoramic image, and extracts a plurality of pieces of information in order to estimate the tilt of the panoramic image.

11. The image processing apparatus according to claim 10, wherein the hardware processor estimates the tilt angle of the panoramic image, and calculates the tilt angle of each of at least the two images constituting the panoramic image using a relative rotation angle between at least the two images constituting the panoramic image.

12. The image processing apparatus according to claim 1, further comprising a sensor acquisition unit that acquires data from a sensor unit, which measures motion of an image capturing unit, wherein the sensor acquisition unit calculates auxiliary information in order to estimate the tilt angle of the image from the tilt angle.

13. The image processing apparatus according to claim 12, wherein the hardware processor estimates a vertical direction of the image using the auxiliary information acquired from the sensor acquisition unit, and determines which the tilt angle of the line segment or the pixel, which is extracted from the image, is a vertical line.

14. An image processing method comprising:

an image acquisition step;

a tilt information calculating step of calculating a plurality of pieces of tilt information to each pixel of an image acquired in the image acquisition step in order to estimate a tilt of the image;

an angle histogram generating step of generating an angle histogram, which is of a frequency distribution of each tilt angle, using the plurality of pieces of tilt information calculated in the tilt information calculating step;

a tilt information-position recording step of recording correspondences between the plurality of pieces of tilt information and positions on the image in which the plurality of pieces of tilt information are acquired;

a tilt information distribution degree calculating step of calculating a distribution degree of the tilt information from the plurality of pieces of tilt information and the positions of the plurality of pieces of tilt information;

a fake information determination step of determining the tilt information that can be used in tilt estimation and the tilt information that cannot be used in the tilt estimation in the plurality of pieces of tilt information from the distribution degree of the tilt information;

a peak detecting step of extracting a maximum value or a maximum of the usable angle histogram based on a determination result of the fake information determination step; and a tilt estimation step of estimating the tilt angle of the image from the tilt angle indicated by the maximum value or the maximum, which is detected in the peak detecting step, wherein the distribution degree of the tilt information is a variance or a standard deviation for the position at the identical tilt angle or each tilt angle existing in the predetermined range.

15. An integrated circuit comprising the image processing apparatus according to claim 1.

16. A non-transitory computer readable medium storing a program to make a computer execute the steps of the image processing method according to claim 14.

\* \* \* \* \*